United States Patent [19]

de Lappe et al.

[11] Patent Number: 4,468,324
[45] Date of Patent: Aug. 28, 1984

[54] FILTRATION AND EXTRACTION APPARATUS

[75] Inventors: Brock W. de Lappe, Bodega Bay; Robert W. Risebrough; Wayman Walker, II, both of Berkeley; Edwin H. Colledge, Vacaville, all of Calif.

[73] Assignee: The Regents of the University of Calif., Berkeley, Calif.

[21] Appl. No.: 385,541

[22] Filed: Jun. 7, 1982

[51] Int. Cl.³ ............................................. B01D 29/14
[52] U.S. Cl. .................................... 210/350; 210/485; 210/489
[58] Field of Search .................... 210/807, 350–352, 210/484, 489, 496, 485

[56] References Cited

U.S. PATENT DOCUMENTS

| | | | |
|---|---|---|---|
| 515,769 | 3/1894 | Harris | 210/350 |
| 1,305,483 | 6/1919 | Matsumura | 114/244 |
| 1,367,325 | 2/1921 | Probst | 210/317 |
| 2,029,078 | 1/1936 | Matney | 210/131 |
| 2,593,227 | 4/1952 | Wagner | 210/350 |
| 3,034,655 | 5/1962 | York | 210/484 |
| 3,677,278 | 7/1972 | Jones | 137/81.5 |
| 4,162,216 | 7/1979 | Nyer | 210/807 |

OTHER PUBLICATIONS

A Single Page Diagram is Enclosed which Depicts a Slocum Column which includes a Sampling Device Comprised of a Plurality of Foam Plugs Retained in a Column by Clips–Dated: 1976, 1980.

Primary Examiner—Ivars C. Cintins
Attorney, Agent, or Firm—Fliesler, Dubb, Meyer & Lovejoy

[57] ABSTRACT

A filtration and extraction apparatus comprises a housing, a plurality of cages disposed in a passage of said housing, compressible filtration and extraction mechanisms which are disposable in each cage and mechanisms for simultaneously positioning said cages within the passage and compressing at least a portion of the filtration and extraction mechanisms so as to prevent the channeling of fluid around said filtration and extraction mechanisms.

4 Claims, 4 Drawing Figures

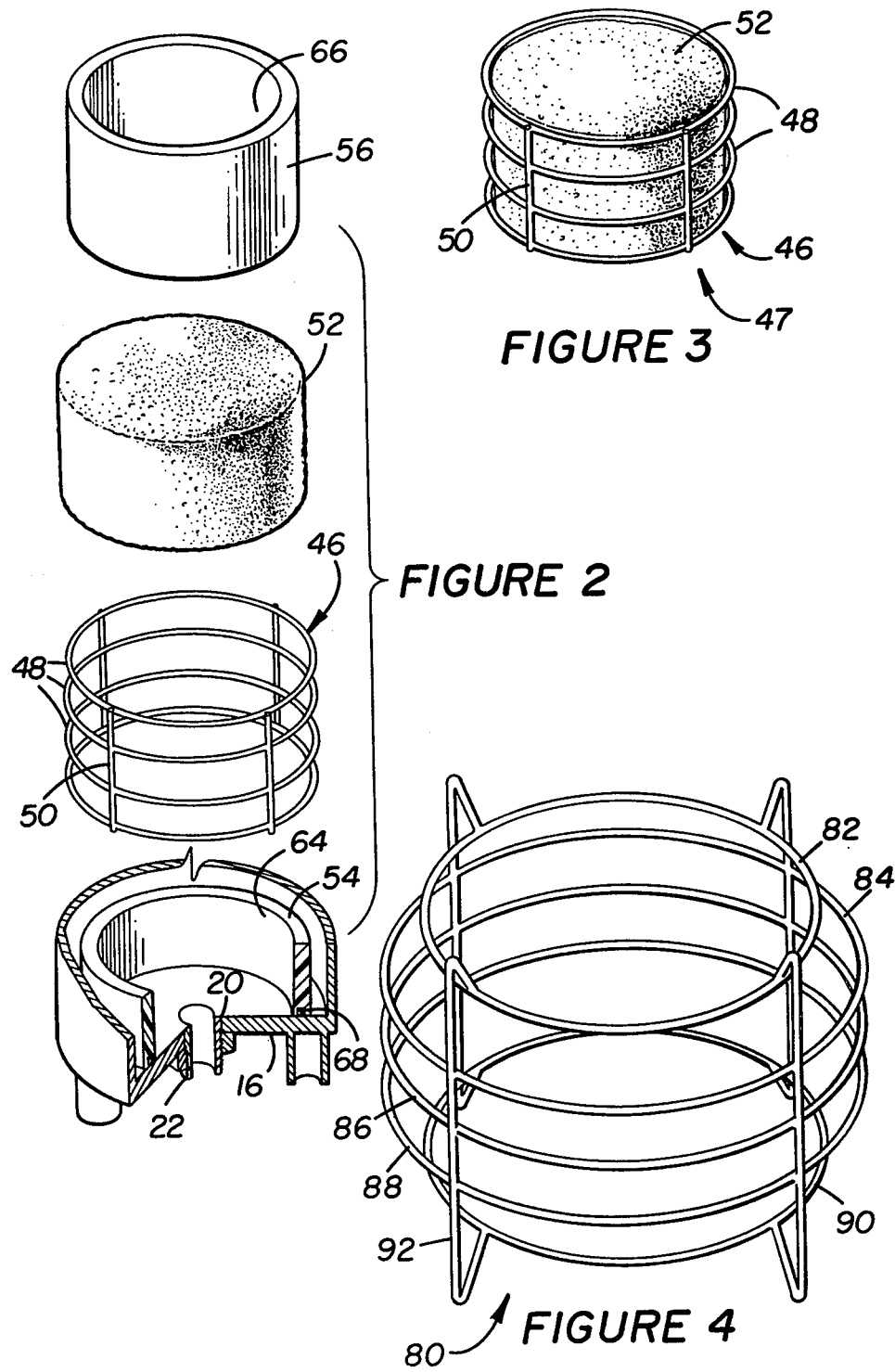

FILTRATION AND EXTRACTION APPARATUS

DESCRIPTION

1. Technical Field

The present invention relates to a filtration and extraction apparatus and in particular to an apparatus for collecting materials which may be carried along by, dissolved in and the like, a stream of fluid passing therethrough.

2. Background Art

There are a variety of filtration and extraction devices commercially available which can be used in a variety of situations to sample and filter a stream of fluid passing therethrough.

One such filtration and extraction device includes a column in which a plurality of foam plugs are disposed. The upper and lower plugs are held in place by spring clips which are seated in internal grooves cut in the column. The fluid is allowed to flow along the length of the column and the foam plugs filter and extract any material which may be carried along with the fluid.

The principal deficiency of this device is that when subjected to a sufficiently strong fluid and in particular liquid flow, by either positive or vacuum pressure, the foam plugs within the column can move to compress tightly together at the exhaust end of the column. In this condition, the fluid passing through the column may avoid passing evenly through the foam by channeling along the walls of the column. This channeling could result in an incomplete recovery of materials carried in the fluid stream.

Also when attempts are made to remove the foam plugs from the column preparatory to assessing the material collected thereby it is possible for the plugs to tear in their wetted condition. It is also possible for the plugs to tear when they are suspended in solvents which remove the materials collected thereby.

The present invention is directed to overcome one or more of these problems as set forth above.

DISCLOSURE OF THE INVENTION

In one aspect of this invention a filtration and extraction apparatus comprises a housing having a passage, a cage which is selectively positionable in the passage and means for filtration and extraction which is positionable in the cage, which means for filtration and extraction is compressible. The filtration and extraction apparatus further includes means for simultaneously positioning said cage within said passage and sealingly compressing a portion of said filtration and extraction means.

In another aspect of the invention, the cage includes a plurality of rings and means for fixing said rings in a spaced relationship to each other.

In yet another aspect of the invention the filtration and extraction means includes a compressible foam pad.

In still another aspect of the invention wherein the cage has an upper and a lower port, said positioning and compressing means includes first and second spacers which are positionable in said passage, which spacers have diameters which are less than the diameter of said ports so that said first spacer can extend into said upper port and said second spacer can extend into said lower port to compress a portion of said filtration and extraction means. Accordingly as the filtration and extraction means is compressed, it becomes sufficiently dense or impermeable between the spacers so as to prevent channeling which is possible with the prior devices.

Also the cages allow the filtration and extraction means to be handled without contact therewith so that the possibility of tearing of the filtration and extraction means is reduced, if not eliminated. Further the use of the cages is important for contamination control as the cage can be handled with forceps as it may not always be advisable to so handle the filtration means. Also the cages allow the foam pads to be loaded into the passage without the foam pad bending over on itself due to friction between the passage and the foam pad.

BRIEF DESCRIPTION OF THE DRAWINGS

FIG. 2 is an exploded view of a portion of the filtration and extraction apparatus and a cage, spacers and sampling means thereof; and FIG. 3 is a perspective view of an extraction unit which includes a foam pad positioned inside a cage.

FIG. 4 depicts an alternate embodiment of a cage for the sampling apparatus of the invention.

BEST MODE OF CARRYING OUT THE INVENTION

Figure 1:
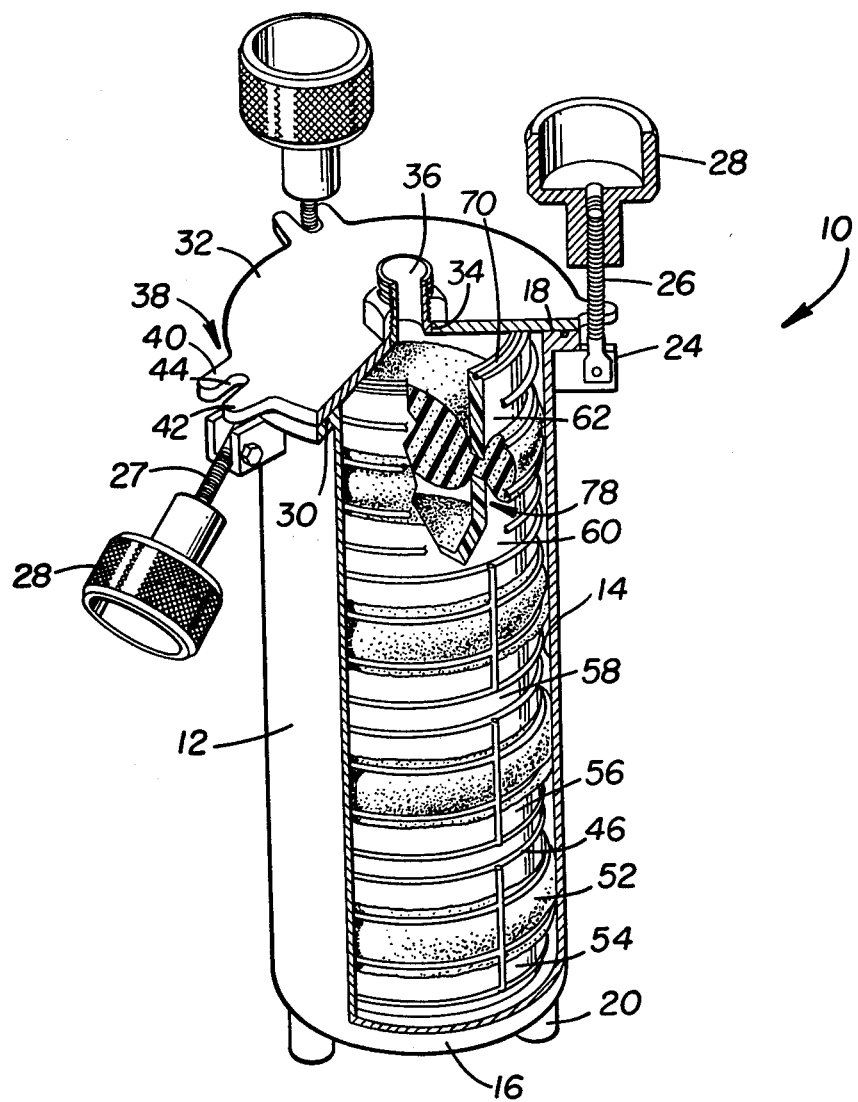
FIG. 1 is a perspective view partially cut away of an embodiment of the filtration and extraction apparatus of the invention.

Referring to FIGS. 1 and 2 an embodiment of the filtration and extraction apparatus 10 is depicted. Filtration and extraction 10, which it should be understood can handle a variety of fluids including gases and liquids, includes a vessel or housing 12 which in a preferred embodiment is comprised of stainless steel. Housing 12 defines an internal passage 14 which is closed at one end by base portion 16 of housing 12 and which defines an opening 18 at the other end thereof. A flange 19 extends axially from housing 12 about opening 18. Housing 12 further includes pedestals such as pedestal 20 extending from the base 16 which are used to support and position said housing 12. As can be seen in FIG. 2 base 16 has a port 20 provided therethrough, which bore mounts a threaded fitting 20.

Located adjacent opening 18 and under flange 19 are three bolt mounts, such as mount 24, which are secured to the outer surface of housing 12. Bolt mounts pivotally mount bolts such as bolt 26, which bolt 26 in a preferred embodiment is comprised of stainless steel. Threadingly secured to the bolts are tightening knobs such as tightening knob 28 which in a preferred embodiment is comprised of brass. In a preferred embodiment opening 18 is machined to receive an O-ring 30 which can be comprised of an elastomeric material.

Housing 12 further includes a generally circular cap 32 which defines a port 34 which receives a threaded fitting 36. Three prong couplets such as prong couplet 38 are disposed about and extend from the periphery of the cap 32. These prong couplets can be positionable immediately above the bolt mounts and include first and second prongs such as prongs 40 and 42 of couplet 38 which define therebetween a channel such as channel 44, which channel 44 receives a bolt 27. When bolt tightening knobs such as knob 28 tighten down on cap 32, the cap 32 can be secured in a water tight manner to the remainder of the housing 12.

The embodiment of the invention further includes one or more cages such as cage 46 (FIGS. 1, 2 and 3) which are comprised of a plurality of rings 48 having substantially the same diameter, which diameter is less than the internal diameter of passage 14. Rings 48 are disposed in space relationship with each other and are held in such position by uprights 50 appropriately secured to said rings 48 by welding and the like. Cage 46 in a preferred embodiment is comprised of stainless steel. As can be seen in the preferred embodiment in FIG. 1 there are four such cages disposed in the internal passage 14.

The filtration and extraction apparatus 10 further includes a filtration and extraction mechanism such as mechanism 52 which in a preferred embodiment are comprised of a foam pad having an uncompressed size so that it substantially fills the space defined inside of cage 46. In a preferred embodiment mechanism 52 includes a high-density, porous, open cell, polyurethane foam pad. As can be seen in FIG. 1 there is a pad such as pad 52 disposed in each of the cages such as cage 46. The foam pad can sample by both filtration of materials in a fluid and also by adsorption. Accordingly when sampling water and the like large particles can be mechanically trapped by the foam pad and dissolved organic compounds can be adsorped in the foam pad. Each foam pad and cage form an extraction unit 47 (FIG. 3), which can easily be removed and replaced as explained below.

The filtration and extraction apparatus 10 further includes mechanisms for simultaneously positioning the cages 46 within the passage 14 and compressing the filtration and extraction mechanisms. This mechanism includes spacers such as spacers 54 and 56 in FIG. 2, and additionally spacers 58, 60 and 62 in FIG. 1. The spacers have an external diameter which is slightly less than the diameter of the rings in cages 46 and define internal passages such as passages 64 and 66 of spacers 54 and 56 respectfully. In a preferred embodiment it is noted that these spacers are comprised of teflon. Further it is to be noted that spacers 54 and 62 differ from other spacers in that they have approximately half the vertical height of the other spacers and that on the edge of spacer 54 which is located adjacent base 16 and on the edge of spacer 62 which is located adjacent cap 32 are received O-rings 68 and 70 respectfully. Again in a preferred embodiment these are rings comprised of elastomeric material. These O-rings provide a sealing arrangement between the base 16 and the spacer 54 and also between cap 32 and the spacer 62.

It is to be understood that alternatively the cages can include a cylindrical sleeve (not shown) with upper and lower internally directed flanges which retain the foam pad within the cylinder.

INDUSTRIAL APPLICABILITY

The operation of the filtration and extraction apparatus is as follows. Initially the pads 52 are mounted in the cages 46. Then the spacer 54 is disposed in the internal passage 14 of the housing 12 followed by a first cage with a pad and then followed by the second spacer 56. Another cage with pad is then inserted followed by the spacer 58 and then followed by another cage and pad. Next spacer 60 is inserted followed by the cage and pad followed by spacer 62. At this point, the stack of cages and spaces extend considerably above the top of housing 12. Cap 32 is brought into contact with spacer 62 and then urged toward the housing 12. As this is accomplished, the end spacers 54 and 62 penetrate into the adjacent cage and pad so as to compress the pad in the cage. The middle spacers 56, 58 and 60 extend into the cage and pad combination immediately above and below each such spacer so as to compress the pads therein. It is to be understood that the middle spacers 56, 58 and 60 have substantially twice the vertical height as the other spacers as they are required to extend into two adjacent cages. The pads 52 are firmly held in place by and between adjacent spacers. The pads 52 are compressed to such an extent that the open cell structure collapses and a water tight seal is formed between adjacent spacers as, for example, indicated at 78. This arrangement along with the O-rings 68 and 70 prevent channeling of the fluid around the foam pads and keep the pads properly positioned.

Additionally it should be understood the filtration and extraction apparatus of the invention provides for in-line sampling through fittings 22 and 36 which is nondisruptive to the fluid flow.

The filtration and extraction apparatus may also be used as a qualitative and quantitative sampling device for the determination of materials carried within the third stream. After exposure to a fluid stream, individual foam pads may be treated to remove filtered and/or adsorpted materials. If each pad has sampled approximately the same volume and weight of material there is an indication of saturation of the apparatus. If on the other hand each successive pad samples less by volume and weight than the previous pad then the efficiency of filtration and/or extraction of the apparatus can be determined.

The filtration and extraction apparatus can be used in a stationary lab, on shipboard or with proper preparation in an apparatus which is towed behind a ship. The apparatus 10 can be used to sample for example organic compounds which are dissolved in water.

Once the sampling has been completed, the apparatus 10 can be opened and, for example, forceps can be used to remove the spacers and the cages which contain the now compressed and wetted pads. It is to be understood that as the cages can be handled without handling the pads, the risk of tearing and contaminating the pads is greatly reduced or eliminated. The pads can then be treated to determine the materials which were collected thereby.

An alternative preferred embodiment of the cage is depicted in FIG. 4 and identified by numeral 80. Cage 80 includes five stainless steel rings 82 through 90. The upper and lower rings 82 and 90, respectively, have smaller diameters than the middle rings 84, 86 and 88 which have substantially the same diameter. The upper and lower rings define upper and lower ports. Uprights such as upright 92 rigidly secure the rings such that a space relationship is formed between the rings. Cages 80 serve the same function and operation as do cages 46 and in addition they serve to guide and position the spacers as the rings 82 and 92 have a diameter which is slightly larger than the diameter of the spacers for receiving and positioning same. Cages can also be fabricated from a tube or sheets of material producing a cylinder with inwardly sloping flanges at both ends.

From the above it can be seen that the present invention solves the problems of channeling and pad tearing of the prior art and provides a sampling apparatus which is highly advantageous for a variety of uses.

Other aspects, objects and advantages of the invention can be obtained from a study of the drawings, the disclosure, and the appended claims.

We claim:
1. A filtration and extraction apparatus comprising a housing having a passage;

a plurality of removable cages which are selectively positionable in said passage, each said cage including an upper and a lower ring, said upper ring defining an upper opening and said lower ring defining a lower opening and a passage connecting said upper opening and said lower opening, each cage further including means for holding said upper and lower ring in spaced relationship to each other;

means for filtration and extraction which is selectively positionable through one of said upper and lower openings into said passage of each said cage, which means is porous and compressible;

means for positioning each said cage within said passage and compressing a portion of said filtration and extraction means so as to prevent the channeling of fluid around said filtrating and extraction means;

said positioning and compressing means includes a plurality of cylindrical spacers which are selectively positionable through said upper and lower openings into said passage of said cages, each spacer having a height such that it extends substantially into said cages;

said spacers being disposed alternately in said passage of the housing with the cages with the filtration and extraction means, with spacers located on alternate sides of the cages compressing the filtration and extraction means therebetween so that the filtration and extraction means is no longer porous in the compressed area to define an internal third passage so as to prevent the channeling of fluid around said filtration and extraction means and between said spacers and said passage of said housing.

2. The apparatus of claim 1 wherein said flitration and extraction means includes a compressible foam pad.

3. The apparatus of claim 2 wherein said foam pad is comprised of, open-cell, polyurethane foam.

4. The apparatus of claim 1 wherein said housing has an upper end with an upper port and a lower end with a lower port and wherein one spacer is located adjacent the upper end with the passage of the spacer communicating with the upper port and another spacer is located adjacent the lower end with the passage of the spacer communicating with the lower port, each such spacer having an O-ring means for providing sealing between one spacer and the upper end and between the another spacer and the lower end.

* * * * *